United States Patent [19]

Emma et al.

[11] Patent Number: 4,943,908
[45] Date of Patent: Jul. 24, 1990

[54] MULTIPLE BRANCH ANALYZER FOR PREFETCHING CACHE LINES

[75] Inventors: Philip G. Emma, Danbury, Conn.; Joshua W. Knight, III, Mohegan Lake; James H. Pomerene, Chappaqua; Rudolph N. Rechtschaffen, Scarsdale, all of N.Y.; Frank J. Sparacio, North Bergen, N.J.

[73] Assignee: International Business Machines Corporation, Armonk, N.Y.

[21] Appl. No.: 128,008

[22] Filed: Dec. 2, 1987

[51] Int. Cl.⁵ ..................... G06F 9/30; G06F 12/12
[52] U.S. Cl. .................. 364/200; 364/243.42; 364/261.3; 364/261.7; 364/232.9; 364/263.1
[58] Field of Search ... 364/200 MS File, 900 MS File

[56] References Cited

U.S. PATENT DOCUMENTS

| | | | |
|---|---|---|---|
| 3,559,183 | 1/1971 | Sussenguth | 364/200 |
| 4,200,927 | 4/1980 | Hughes et al. | 364/200 |
| 4,435,756 | 3/1984 | Potash | 364/200 |
| 4,477,872 | 10/1984 | Losq et al. | 364/200 |
| 4,551,799 | 11/1985 | Ryan et al. | 364/200 |
| 4,561,052 | 12/1985 | Tateno | 364/200 |
| 4,594,659 | 6/1986 | Guenthner et al. | 364/200 |
| 4,679,141 | 7/1987 | Pomerene | 364/200 |
| 4,691,277 | 9/1987 | Kronstadt et al. | 364/200 |
| 4,730,249 | 3/1988 | O'Quin, II et al. | 364/200 |
| 4,760,520 | 7/1988 | Shintani et al. | 364/200 |
| 4,761,731 | 8/1988 | Webb | 364/200 |
| 4,764,861 | 8/1988 | Shibuya | 364/200 |
| 4,777,594 | 10/1988 | Jones et al. | 364/200 |

OTHER PUBLICATIONS

Hughes et al., "Decode Branch History Table", IBM TDB, vol. 25, No. 5, Oct. 1982, pp. 2396-2398.
"Using a Small Cache to Hedge for a BHT", IBM TDB, vol. 28, No. 4, Sep. 1985, p. 1737.
Pomerene et al., "Reducing Cache Misses in a Branch History Table Machine", IBM TDB, vol. 23, No. 2, Jul. 1980, p. 853.
Rechtschaffen "Using a Branch History Table to Prefetch Cache Lines", IBM TDB, vol. 22, No. 12, Mar., 1980.
"Prefetching Using a Pageable Branch History Table", IBM, vol. 28, No. 8, Jan. 1986, pp. 3510-3511.
Pomerene et al., "Dynamic Branch Prediction Using Branch Table", IBM, vol. 22, No. 8A, Jan. 1980, p. 3437.

Primary Examiner—Thomas C. Lee
Attorney, Agent, or Firm—Terry J. Ilardi; Ronald L. Drumheller

[57] ABSTRACT

Apparatus for fetching instructions in a computing system. A broadband branch history table is organized by cache line. The broadband branch history table determines from the history of branches the next cache line to be referenced and uses that information for prefetching lines into the cache.

9 Claims, 12 Drawing Sheets

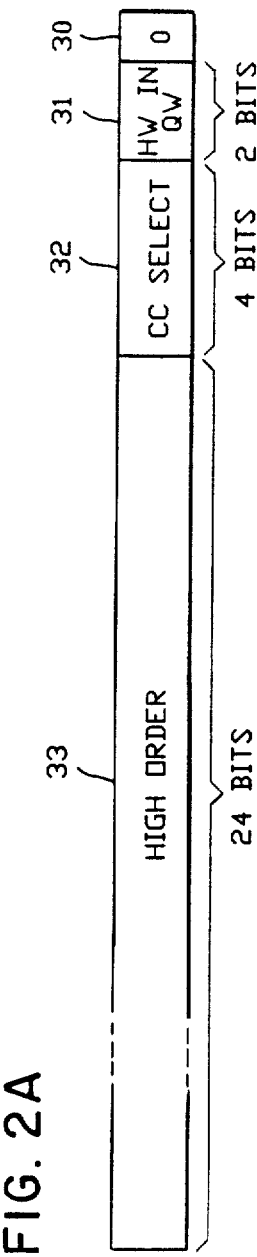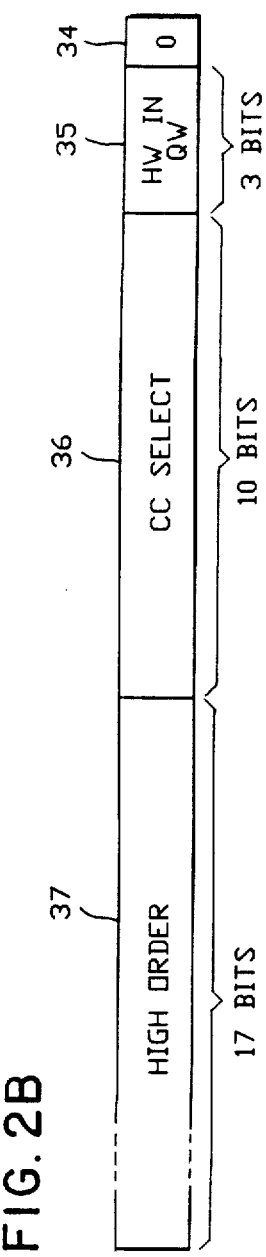

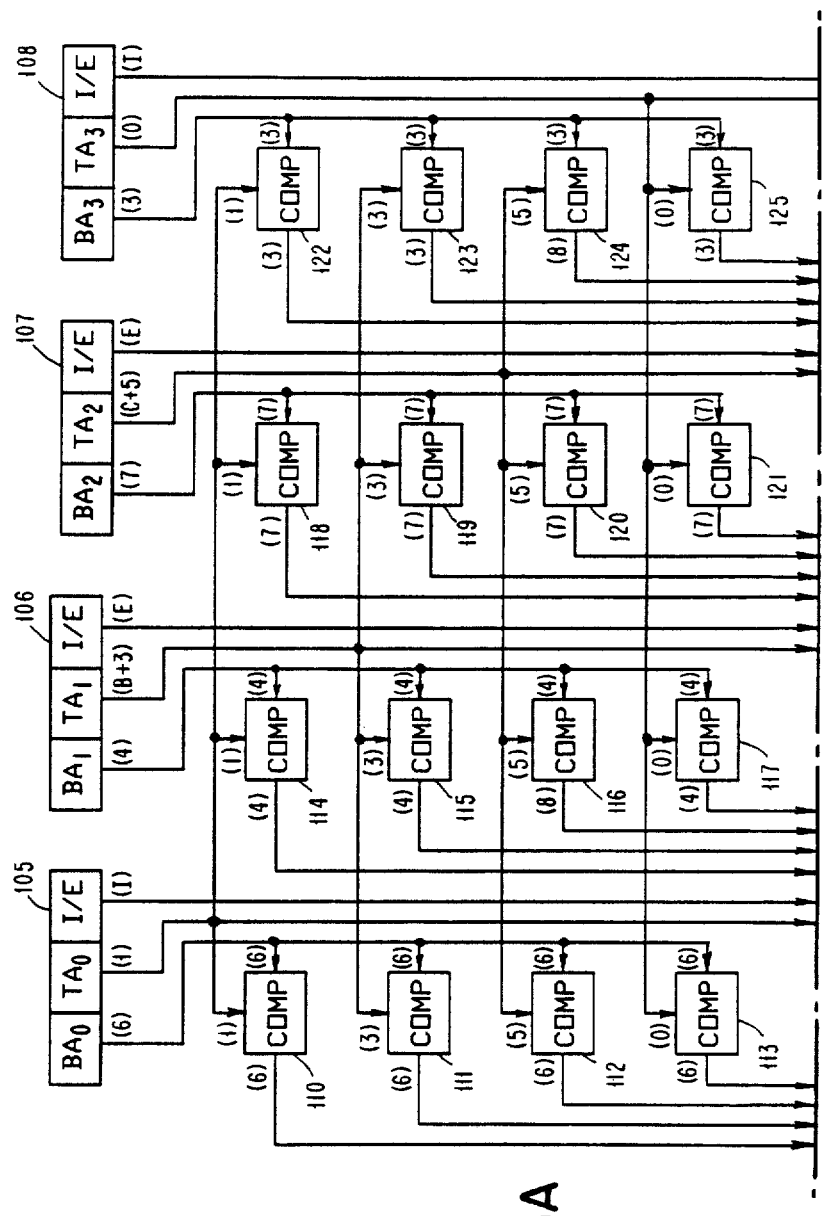

MULTIPLE BRANCH ANALYZER FOR PREFETCHING CACHE LINES

BACKGROUND OF THE INVENTION

1. Field of the Invention

The invention relates in general to caches in a data processing system and more particularly to an apparatus for improving cache performance by using a branch history table to prefetch for the cache.

2. Description of the Prior Art

Since the usage of pipelining in high performance computer processors first began it has been known that a primary inhibitor to high performance was the presence of conditional branches in the code to be processed. Prior to the use of pipelining, operation of a digital computer could be most conveniently described by the following sequence of six events:

1. Fetch an instruction;
2. Decode the instruction;
3. Access the relevant registers and perform an appropriate calculation to determine the address of an input operand;
4. Fetch the relevant input operand;
5. Perform the operation as specified by the instruction using the input operand;
6. Store the results of the operation.

A nonpipelined machine performs these steps sequentially, then fetches the next instruction and repeats the sequence.

In a pipelined machine, each of these steps are physically implemented as separate hardware units in parallel. All units operate concurrently on a sequence of instruction as follows: while an instruction is storing its final results, the next instruction performs a functional operation, while the next instruction fetches an input operand, while the next instruction calculates an operand address, while the next instruction is decoded, while the next instruction is fetched from memory. As long as the sequence in which the instructions are to be processed is known, it is possible to fetch instructions and then send them into the pipeline at the rate of one per cycle. Thus, instead of requiring a theoretical six cycles per instruction each instruction can be executed in what amounts to one machine cycle. This scenario, while very effective for strictly sequential instructions is less effective if the instructions are not executed in sequence. Out of sequence operation is caused by branch instructions. A branch instruction allows a computer to make decisions based on data available to it and in fact this capability is responsible for much of the power of modern day computers. The effect of a taken branch is to discontinue the decoding of instructions that are sequentially subsequent to the branch, and to begin decoding instructions from another location in memory. A conditional branch is a branch instruction that only performs this transfer of instruction execution (the branch) pending some condition (typically, the outcome of the instruction that immediately precedes the branch instruction).

Thus, branch instructions disrupt the smooth sequencing of pipeline operation, since at the time they are decoded, it is generally unknown whether they will be taken and where they will be taken to (the target). Various attempts have been made in the prior art to reduce the penalty inflicted upon a pipelined machine due to branches. The present invention uses the information provided by a branch prediction mechanism to reduce the effects of what are known as cache misses.

A cache is a local memory that is typically much smaller and much faster than the main memory of the computer. Virtually all high-performance digital computers use a cache, and even some commercially available microprocessors have local caches. The rationale for the use of the cache is partially motivated by the use of pipelining, since the splitting of a serial processor into several parallel pipeline stages causes the processing time per stage to be significantly less than the overall processing time of a single instruction. Thus, a pipelined machine necessarily has a much shorter cycle time. Therefore, a memory with a fixed access time requires more of the shorter pipeline cycles to perform an access than is required of the longer nonpipeline cycles. A side effect of pipelining a machine is to make the access time to memory to appear larger with respect to the number of processor cycles.

Caches were developed because it was not possible to build extremely large memories at a reasonable cost that could operate at a cycle time commensurate with the pipeline. It was, however, possible to build small memories that could keep up with the pipeline. In a cache, the processor stores the items, (both instructions and data) that it has referenced most recently. If the processor references the items again, then it can obtain the items from the cache at the pipeline cycle time. These references are called cache hits. When the processor references an item that is not in the cache, then the processor must obtain the item from the considerably slower main memory. A reference to the main memory is caused by what is known as a cache miss.

It has been observed that items, (either instruction or data) once referred to, can be referred to again in the near future. This property is known as the "temporal locality of reference," and it is the rational for keeping the most recently referenced items in the cache. It is also heuristically observable that if an item is referenced, then other items that are physically close to the referenced item are also likely to be referenced. This second property is known as "spatial locality of reference," and it is the rational for keeping cache lines that are blocks of contiguous items.

As previously discussed, a typical computer includes a large main memory and a pipelined processor with a local cache. Conceptually, the processor fetches instructions from its cache, decodes them, fetches operands from its cache, and executes the instructions. In practice there is usually an intermediate level of buffering between the cache and the processor that holds the instructions that are to be decoded in the immediate future. This is known as the instruction buffer.

Like the cache, (except on a much smaller scale) the instruction buffer holds contiguous blocks of instructions. However, where a cache line may be typically 64 or 128 bytes, a block in the instruction buffer is typically 8 bytes. In mainframe computers, on the average, an 8 byte block holds two instructions. Therefore, every instruction fetch initiated to the cache results in possibly two useful instructions being transferred to the instruction buffer. This alleviates some of the bandwidth requirement that is placed on the cache and this is the first essential purpose of the instruction buffer. The second essential purpose of the instruction buffer is to contain controls that allow for the blocks to be shifted such that instructions can be transferred to the decode unit of the pipeline in proper alignment.

The two main ways in which the instruction buffer differs from the cache are its small size and its absence of reuse. The size of the instruction buffer is typically in the range of 8 to 32 bytes while the size of the cache is typically 64 k to 256 k bytes. The cache must emulate the main memory in every way and all accesses to the cache are done with real addresses. On the other hand, when blocks of instructions are placed into the instruction buffer, they are only recognized on the basis of virtual addresses. Since the instruction buffer is small, and since it has no directory (to identify the associated real address) items in the buffer are used once and discarded. Thus, when a block of instructions is placed in the instruction buffer, the processor merely decodes the sequential instructions until a branch is reached. If the branch is taken, then a new block of instructions is transferred to the instruction buffer, and decoding resumes.

It should be noted that the term "prefetch" when used in the context of cache prefetching is not the same as "prefetch" when used in the context of fetching instructions into the instruction buffer.

The term prefetch, when used in the context of an instruction buffer, merely means to place instructions in the buffer prior to the time that they will be decoded (although there need not be any doubt that the prefetched instructions will be decoded). The term prefetch, when used in the context of a cache, always means to guess that a particular line in memory will be used, and to transfer that line to the cache prior to the time that it is known with certainty that the line will be referenced by the processor. Therefore, prefetching into an instruction buffer may not require any special mechanisms, i.e., this form of prefetching can be done on a strict demand basis with very little control. Prefetching into the cache, however, almost always requires some type of clever mechanism that initiates fetching based on events that may be only peripherally related to the actual demand fetches.

In a memory hierarchy, such as the one described here, various forms of fetching all take place concurrently. Each of the mechanisms uses its own address registers based on the type of fetching for which the mechanism is designed. The decoding stage in the processor fetches individual instructions from the instruction buffer using what is sometimes called the "Program Counter"(PC). The Program Counter contains the address of the instruction to be decoded.

Instructions are aligned on halfword (2 byte) boundaries, so that a halfword address represents the state of the machine, i.e., the position in the program that the machine has logically assumed The mechanism that fetches doubleword (8 byte) blocks into the instruction buffer uses what is called the "Buffer Fetch Address." This is a doubleword address that can be generated on a demand basis, or it can be generated by a branch prediction mechanism. Finally, the address used to fetch lines into the cache is generated by the miss facility, either on the basis of demand fetches or on the basis of a cache prefetch mechanism.

If there were no such things as branch instructions, there would never be any doubt as to what instruction or block of instructions or cache lines to fetch. The processor would merely fetch sequential instructions from the instruction buffer on a continuous basis, the instruction buffer prefetch mechanism would fetch sequential blocks from the cache on a continuous basis, and the cache miss facility would fetch sequential lines from the main memory on a continuous basis. Therefore, branches are the only source of uncertainty in any of the instruction fetching processes. There are three types of branch prediction mechanisms known in the art. They are described to facilitate an understanding of how each of them is different, with respect to the fetching process.

Two of the mechanisms used are variations on what is called a "decode-time" mechanism. The last mechanism is known as a "fetch-time" mechanism. A decode-time mechanism is a mechanism that predicts the outcome of a branch at the time that the branch is decoded. A fetch-time mechanism is a mechanism that predicts the outcome of a branch at the time that a block of instructions that contains the branch is transferred from the cache to the instruction buffer.

The simplest decode-time mechanism known in the art is known as a "static predictor." This mechanism merely guesses the branch outcome based on the type of branch that has been decoded (i.e., based on static information). As an example, it may guess that all Branch on Count (BCT) instructions will be taken but that no branch on index high (BXH) instructions will be taken. Thus, when the decoder decodes a BXH, the mechanism will cause the decoder to continue decoding sequential instructions, since it automatically guesses that the BXH will not pass control to a different part of the program. When the decoder decodes a BCT, the mechanism will always cause the decoder to stop decoding, since it always guesses that the control will be transferred to a different part of the program.

In the case of the BCT, the instruction first enters the pipeline, performs an address calculation to determine the address of the target instruction and then fetches the target block from the cache into the instruction buffer. The block is aligned in the buffer, and the target instruction is passed to the decoder where the decoding resumes. Note that for correctly predicted not-taken branches, the static predictor prevents the pipeline flow from being disrupted. For taken branches, the flow is disrupted so that the target address can be calculated, and the target instruction can be fetched. Decoding, however, can resume prior to the time that the branch instruction is actually executed. Therefore, in the case of correctly predicted taken branches, the static predictor does save a processor cycle.

Other more elaborate decode-time mechanisms known as "Decode History Tables" (DHT) are discussed in Losq et al., U.S. Pat. No. 4,477,872 and "Decode Branch History Table," IBM TDB Vol. 25, No. 5. These use mechanisms that affect the pipeline in exactly the same manner as a static prediction mechanism but additionally use historical information to obtain higher predictive accuracy. A Decode History Table (DHT) is a table of bits, where each bit-entry is accessed with the halfword address (the Program Counter) associated with a branch instruction at the time that the instruction is decoded. The table is used to record the historical information, that is, whether a branch was previously taken or not taken, as the branches are executed. On subsequent execution of these same branches, the table provides information about the last historical outcome and a guess is made that the branch will behave the same way that it did on its previous execution.

Although decode-time mechanisms help the pipeline to the extent that they are able to correctly predict a branch, they fail to fully capitalize on taken branches that are guessed correctly. That is, although correctly guessing a branch does save some of the pipeline delay associated with the branch, the pipeline still must wait until the target address is computed, and the target instruction fetched. A fetch-time mechanism is one that predicts the outcome of a branch at the time that the branch instruction is fetched and then immediately fetches the target instruction if it predicts that the branch will be taken. Thus, a fetch-time mechanism eliminates all pipeline delay for taken branches that it predicts correctly.

A fetch-time mechanism is generally known as a "Branch History Table" (BHT). The Branch History Table is discussed in Sussenguth, U.S. Pat. No. 3,559,183, and Guenthner et al., U.S. Pat. No. 4,594,659, where it is called a "Transfer and Indirect Prediction Table." A Branch History Table is similar to a Decode History Table in that it stores past history but differs in two significant ways.

First, since the branch outcome must be predicted at the time that the branch instruction is fetched from the cache into the instruction buffer (i.e., prior to the time that the branch instruction is decoded) it must recognize that there is a branch based on a match with the doubleword Buffer Fetch Address (and not the Program Counter as used with a Decode History Table). The second difference arises from the fact that since the Branch History Table must initiate an instruction fetch for the target instruction prior to the time that the branch instruction is decoded, it must remember the historical target as well as the historical action of the branch.

Hence, the Branch History Table is a table that contains the addresses of the target instructions to branches that were recently taken. The Branch History Table is driven by the Buffer Fetch Address as follows. When a block of instructions is transferred into the instruction buffer, the Buffer Fetch Address is used to access the Branch History Table. If the Branch History Table has an entry for a branch instruction that is contained in that block of instructions, then the target address is supplied by the entry and a transfer of that block of instructions that contains the target instruction is initiated into the instruction buffer. The Branch History Table is then searched using the address of the target instruction and the operation continues.

Therefore, in a Branch History Table driven machine, the instruction buffer, which uses the Buffer Fetch Address, is driven by the Branch History Table, while the decoder, using the Program Counter, runs independently. Note that since transfers into the instruction buffer are done on a doubleword basis at the rate of one doubleword per cycle, and since the Branch History Table must be searched on every such transfer, the Branch History Table must be organized on a doubleword basis although it must recognize the individual halfword and target addresses.

In U.S. Pat. No. 4,561,052, to Tateno, a simple processing system having a memory, a processing element, and an instruction buffer is described. The memory system is able to service exactly one request on a given cycle, i.e., it is possible to fetch exactly one instruction, or exactly one data operand on a cycle, but not both. Tateno outlines the logic that is required to determine whether a given cycle will be used to fetch an instruction or to fetch data. The logic causes an instruction to be fetched when the instruction buffer is empty or when the currently executing instruction does not require an operand fetch. Tateno uses no cache and there is no mention of branches or of their prediction.

In Potash, U.S. Pat. No. 4,435,756, a decode-time branch prediction is described. There is, however, no discussion of cache misses or Branch History Tables.

In U.S. Pat. No. 4,200,927, to Hughes et al., a description of a prefetching mechanism is made. Hughes describes three instruction buffers and uses static prediction. When a conditional branch is encountered, one buffer receives the instructions along the "fall through" path, and another buffer receives the instructions down the taken-branch path. The static predictor selects one of the two streams to preexecute. If it reaches another conditional branch along the selected path then it uses the static predictor to fetch only one of the subsequent paths into the third instruction buffer.

In Ryan et al., U.S. Pat. No. 4,551,799, a split cache is described in which it has separate caches for instructions and data. There is no teaching, however, of using a Branch History Table to aid the cache prefetching.

In IBM TDB, Volume 28, No. 8, January 1986, p. 3510, "Prefetching Using a Pageable Branch History Table" teaches use of a Branch History Table to fetch cache lines. In order to do so, it suggested a Branch History Table that carried a target address as well as a line-exiting address. When a branch entry was found in the table, the instruction buffer was controlled by the target address and the line-exiting address was used to prefetch cache lines. When a line was exited, (i.e., when the flow of control left the line), an exit analysis was performed by unspecified hardware or software and the line-exiting addresses were updated based on the exit analysis for future use. In subject invention, entry analysis is performed. That is, analysis is performed immediately before or at the time the line is entered. In the subject invention there is no need for line-exiting address in the Branch History Table since the analysis is performed on entry which is the relevant time to prefetch. Further, there is no teaching of a mechanism for performing the branch analysis as in the present invention.

IBM TDB, Volume 22, No. 12, May 1980, p. 5539, "Using a Branch History Table to Prefetch Cache Lines." This article teaches that if a Branch History Table generates a target address to a line that is not in the cache, then it is probably appropriate to prefetch the line into the cache. There is, however, no teaching of organizing the Branch History Table on a cache line basis nor of the analysis of all branch entries in a line to anticipate a cache miss.

IBM TDB, Volume 23, No. 2, July 1980, p. 853, "Reducing Cache Misses in a Branch History Table Machine," teaches making use of a cache miss to identify a misprediction on the part of the Branch History Table. The BCR (Branch on Condition Register) is primarily used to return from subroutines. Since subroutines can be called from many different locations, the primary reason that the BCR is mispredicted is that the historical target address is not the current target address. Therefore, in contra distinction to the present invention, if the Branch History Table generates a target address to a line that is not in the cache, and if the underlying branch is a BCR, then the Branch History Table is probably in error and the prefetch should be suppressed.

In IBM TDB, Volume 28, No. 4, September 1985, p. 1737, "Using a Small Cache to Hedge for a BHT" a method is proposed for minimizing the penalty associated with mispredictions on the part of the Branch History Table. It was suggested in this article that branch target instructions be fetched into the instruction buffer even when the Branch History Table guessed that a branch would not be taken. In the event that the branch guessed not taken was found to be taken, decoding could begin immediately down the taken path since the target instruction would be in the instruction buffer.

IBM TDB, Volume 22, No. 8A, January 1980, p. 3437, "Dynamic Branch Prediction Using Branch History Table" discusses the relationship between cache behavior and the Branch History Table. For caches that remember more history than a Branch History Table, a series of cache misses indicates that new or unremembered code is beginning to run, and that the predictions generated by the Branch History Table are most probably irrelevant to the new code. Therefore, after a series of cache misses, the predictions made by the Branch History Table are ignored, and both the taken and not taken branch paths were fetched to hedge against either outcome.

Accordingly, it is an object of the invention to utilize branch history to prefetch for the cache. It is still another object of the invention to analyze all branch entries in a line to anticipate a cache miss.

These and other objects, advantages and features of the invention will be more apparent upon reference to the specification and drawings.

BRIEF DESCRIPTION OF THE DRAWINGS

FIG. 2A shows the logical partitioning of a branch address in accordance with the dimensions of the local BHT;

FIG. 2B shows the logical partitioning of the branch address in accordance with the dimensions of the broad band BHT;

FIGS. 5, 5A and 5B show a circuit for establishing correspondences between branch instructions as they will be encountered in execution;

SUMMARY OF THE INVENTION

An apparatus is described in which the information contained in a Branch History Table is used to anticipate cache misses and perform cache prefetching of instruction lines based on the use of a branch analysis engine that infers future misses based on projecting the historical branch information. The Branch History Table is organized on a line basis so as to be commensurate with the level of fetch of cache lines to which the subject invention applies.

In a further embodiment of the invention, means for determining the sequence in which branches in a line will be executed based upon the entry point into the line is used to determine which of the exit points will be used.

DETAILED DESCRIPTION OF THE PREFERRED EMBODIMENTS

Figure 1:
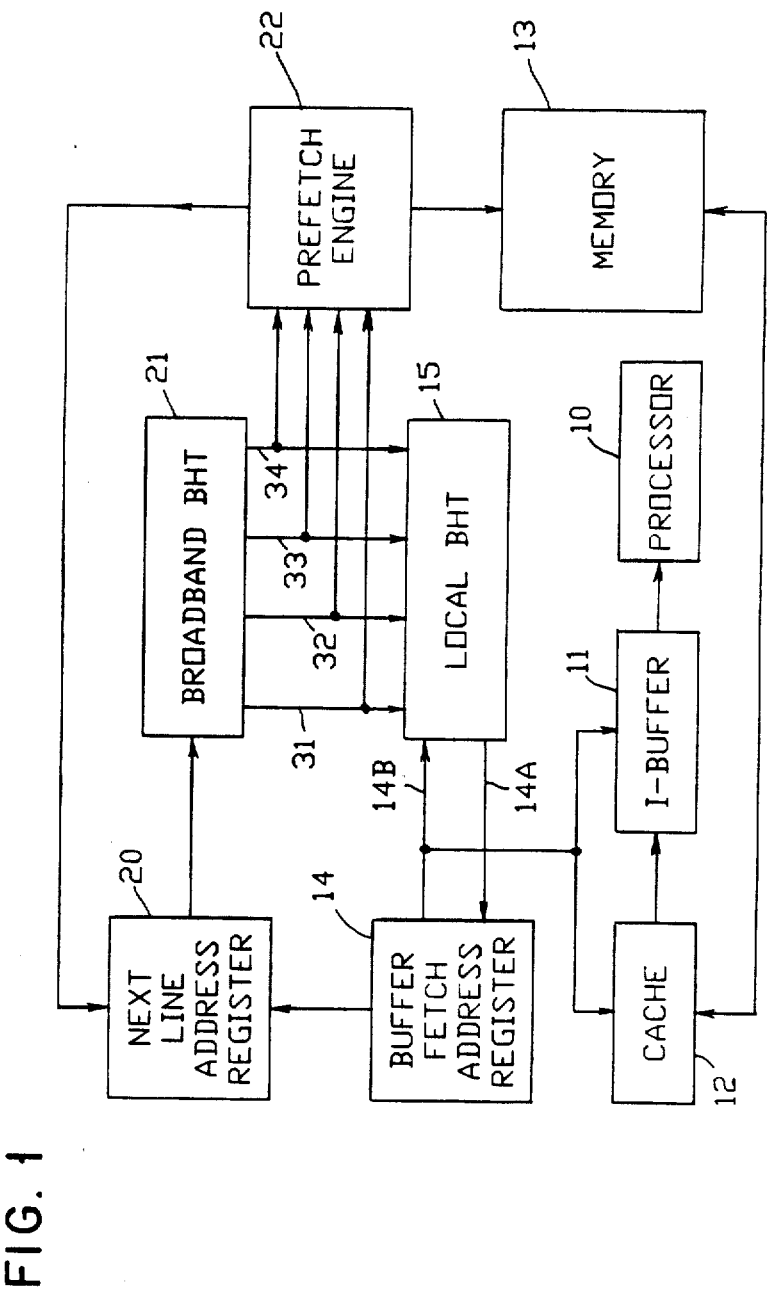
FIG. 1 is an overall block diagram of the present invention.

Refer now to FIG. 1 in which an overall block diagram of the present invention is shown. Processor 10 includes parallel pipeline units which perform the decode, address generation, cache, and execute functions. Instruction buffer 11 is a register that performs the functions previously discussed. Cache 12 provides instructions and data for use by the processor, and memory 13 provides data and instructions also for use by processor 10.

As described above, if the instructions and/or data are not in cache 12 the processor will try to find them in memory 13. Memory 13 includes a directory (not shown) that is an index of the blocks of memory that are stored as lines in cache 12. In alternative embodiments, the directory may be part of the cache. Cache 12 is organized on a line basis and typically includes anywhere from 64 k to 128 k bytes.

Cache 12 transfers doublewords (in a mainframe a word is equal to 4 bytes and therefore a doubleword is equal to 8 bytes) to instruction buffer 11 which holds the doubleword for processing by processor 10.

Local BHT 15 is organized on a doubleword basis and performs the function of a BHT as described above and known in the prior art. Buffer fetch address register 14 is a register that holds the address of the doubleword that is to be transferred from the cache 12 to the instruction buffer 11. This address can be generated either on a demand basis by processor 10 or can be generated by a branch prediction mechanism. In the case illustrated here, the doubleword address is used to search the BHT 15 on line 14B at the time that the doubleword is moved from the cache 12 to the instruction buffer 11. If a branch is predicted by the BHT 15, then the buffer fetch address register 14 is updated to reflect the branch target address on line 14A. The foregoing elements describe a conventional computing system as known in the art. The remaining elements shown in FIG. 1, namely: next line address register 20, broadband BHT 21, and prefetch engine 22 are, however, elements that are new and unique to the present invention.

Next line address register 20 is a register that holds the address of the next line to be referenced. It receives input from the prefetch engine 22 as well as from the buffer fetch address register 14 to-determine the next line to be addressed. It provides the address of the next new line to be referenced to the broadband BHT 21 which is organized on the same basis as cache 12. Thus if cache 12 utilizes a line of 128 bytes so will broadband BHT 21. Prefetch engine 22 contains the mechanism that determines which lines should be prefetched into cache 12 if they are not already there (as indicated by the directory in memory 13) on the basis of branching instructions in the sequence of instructions.

More generally, the next line address register 20 can actually be a queue of entries. This would facilitate the analysis of several future lines so that prefetching could be initiated immediately upon entry into a new line. Confirmation of past prefetching is achieved by comparing the oldest entry in the stack with the buffer fetch address register 14 when a new line is entered.

The entries in the broadband BHT 21 are wide and are specific to lines rather than doublewords as in local BHT 15. Thus, the congruence class is selected by line address, and further comparison can be done on higher order bits within the entries to determine which of the entries are specific to a given line. Also, within each entry, the halfword address within the line must be specified. Since two-way set-associativity is generally adequate for BHTs that are organized on doublewords, eight-way set-associativity should be sufficient for BHTs organized on 64 byte lines.

These aforesaid parameters are of relevance to typical mainframe computers. In the remainder of the embodiment however, smaller dimensions are used to facilitate a simpler illustration of the teachings of this invention. Henceforth, it is assumed that the instruction buffer 11 contains doublewords, and that the local BHT 15 is organized on a doubleword basis. Further, it is assumed that a cache line is a quadword (two doublewords), and that the broadband BHT 21 is organized on a quadword basis. Finally, it is assumed that the local BHT 15 is two-way set-associative and has 16 congruence classes, and the broadband BHT 21 is four-way set-associative and has 1024 congruence classes. Thus, the local BHT 15 contains 32 entries, and the broadband BHT 21 contains 4096 entries.

To further understand the above refer to FIG. 2a and 2b. A branch address in a mainframe computer includes 31 bits. As shown at 30 and 34, the least-significant bit (byte offset) is a 0 and is ignored for purposes of the present invention. As shown at 32 there are 4 bits that are used to select the congruence class in the local BHT, and as shown at 36, there are 10 bits that are used to select the congruence class in the broadband BHT. 33 and 37 indicate the high-order of address bits in the respective BHTs, and 31 and 35 indicate the halfword offset within doubleword, and quadword, respectively. The broadband BHT 21 will thus hold the 17 high-order bits 37, the halfword offset within quadword 35, and as will be described in detail below, the target address (TA$_i$). The local BHT 15 will hold the corresponding fields 33 and 31, and the target address (TA$_i$), and will operate in accordance with the teachings of the prior art.

In the example of four-way set-associativity there will be four such lookup tables within broadband BHT 21 and individual addresses in each of the lookup tables will be selected by the 10 CC select bits 36. Comparisons can then be made to determine if the high order bits 37 match those of the requested line. If so, there is a hit for the address in the next line address register 20.

Assume that the actual sequence of cache lines to be executed has addresses A and B. The address of A is placed via buffer fetch address register 14 into next line address register 20 from where it is then provided to broadband BHT 21. Broadband BHT 21 then broadcasts all hits generated by address A to local BHT 15 and prefetch engine 22. The local BHT 15 then controls the instruction buffer 11 in accordance with the teachings of the prior art. The prefetch engine 22 performs its analysis and should generate the address of line B which will be forwarded to the next line address register 20 and to the cache directory in memory 13. If line B is not listed in the directory as appearing in cache 12, then a cache prefetch mechanism will prefetch the line having address B from memory.

Figure 3:
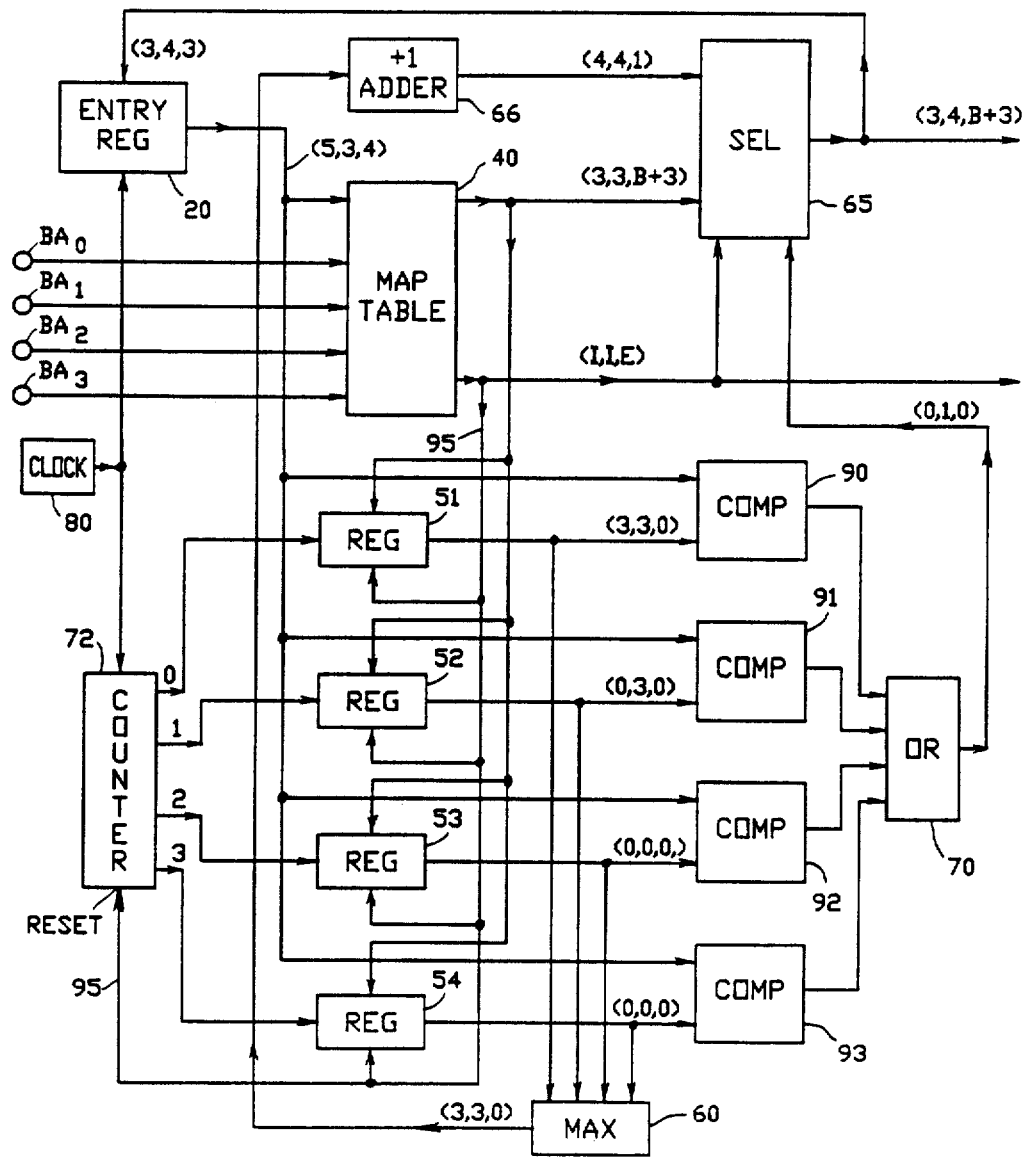
FIG. 3 is a block diagram of a prefetch engine.
Figure 4:
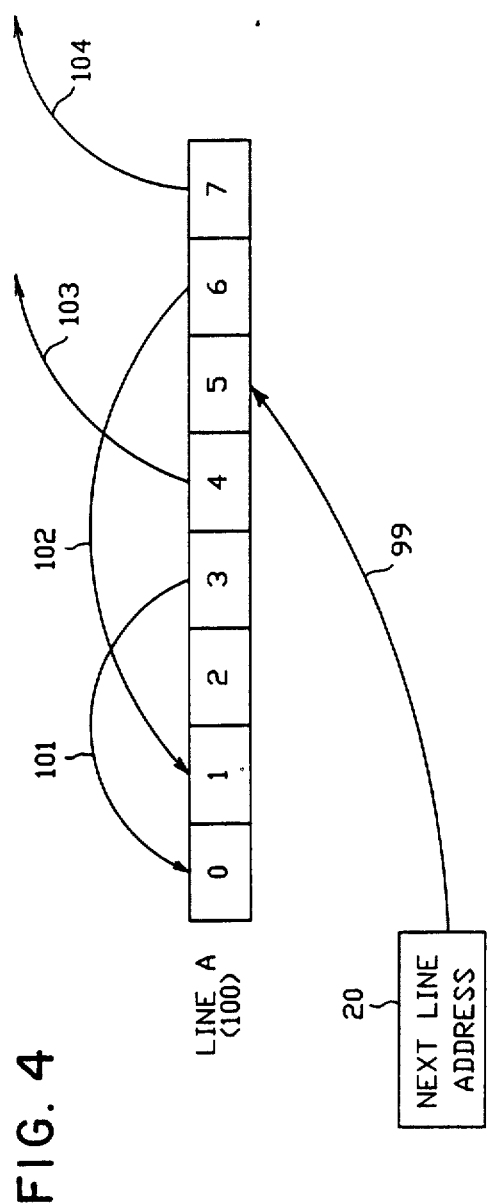
FIG. 4 is a schematic diagram of a cache line with indication of branches.

The operation of the prefetch engine 22 can be understood by referring to FIGS. 3 and 4. FIG. 3 is a block diagram of prefetch engine 22. FIG. 4 shows a line A in BHT 21. For the present explanation, line A (100) is shown as having 8 halfwords numbered 0-7. Solid lines 101, 102, 103 and 104 show branches that are taken in line 100. Thus, there is a branch located at line A, halfword 3 that is taken to halfword 0 of line A represented by 101. Branch 102 represents a branch taken halfword 6 to halfword 1. Branch 103 is located at halfword 4 in line A and goes to a new line B at halfword 3. Branch 104 goes to a new line C at halfword 5. The line is entered at branch 99 to halfword 5. This is received from next line address register 20 as shown schematically.

The sequence of entries for line A are summarized in the following TABLE I:

TABLE I

| Branch Address | Target Address | I/E (Internal = 0) |
|---|---|---|
| BA$_0$ = A + 6 | TA$_0$ = A + 1 | 0 |
| BA$_1$ = A + 4 | TA$_1$ = B + 3 | 1 |
| BA$_2$ = A + 7 | TA$_2$ = C + 5 | 1 |
| BA$_3$ = A + 3 | TA$_3$ = A + 0 | 0 |

Referring to TABLE I, if line A is entered by 99 at location 5 the first branch address that is encountered (denoted as BA$_0$) is A+6 when the entries are subsequently executed. This, as indicated in TABLE I has a target address (TA$_0$) of A+1. An internal/external (I/E) bit is set equal to zero which indicates an internal branch in the line. The branch address 1 (BA$_1$) at A+4 has as its target address an address in line B given as B+3 (TA$_1$=B+3). Since this is an address external to line A the I/E bit is set equal to 1. Branch address 2 (BA$_2$) equals A+7 and branches to another external line C at halfword 5, thus TA$_2$ equals C+5 and again I/E bit is set equal to 1. The fourth entry in TABLE I indicates that BA$_3$ equals A+3 which has a target address (TA$_3$) of A+0. Since this is a branch internal to line A the I/E bit is set equal to zero.

Referring again to FIG. 1 the entries shown in TABLE I are broadcast on lines 31, 32, 33 and 34. Thus BA$_0$ along with TA$_0$ is broadcast on line 31, BA$_1$ and TA$_1$ on line 32, BA$_2$ and TA$_2$ on line 33 and BA$_3$ and TA$_3$ on line 34 along with the respective entry for the I/E bit. Refer again to FIG. 3. Entry register 20 actually need only contain the halfword within quadword of the next line address for addressing the map table 40. Entry register 20 is initially loaded with the entry point into the new line. In the case of line A this is via 99 and the entry point is 5. It should be noted that for use and understanding the flow of operation of the present invention the entries that appear at the various registers, tables, etc. in FIG. 3 are indicated adjacent to the registers in parentheses and are separated by semicolons to indicate results of sequential operations.

For any entry point, map table 40 provides the following. It normalizes the entry point to correspond to the first taken branch that will be encountered scanning forward in the line at the actual entry point and provides eitheral (1) the internal address of the next taken branch that will be encountered after taking the branch corresponding to the normalized entry point, if the normalized entry point is taken internally, or (2) the entry into a new line if the normalized entry point branch is taken externally, or (3) the address of the next sequential line if the normalizing process does not encounter a taken branch.

Referring again to FIG. 4, the line A will be entered at address 5 and at address entry 6 will branch to entry 1 then proceeding in sequence the next branch will occur at entry 3. Thus, when the value 5 is used to access the Map Table, the Map Table should output the value 3 with the I/E indicator set to zero.

TABLE II shows sample contents of map table 40 and in particular, in accordance with line A (100) it shows 8 locations and the contents of each of those locations. It will be noted that, for example, entries 0 through 3 contain the internal address of the next taken branch and the indication that it is an internal branch obtained by scanning sequentially forward through the locations in line A. At entry 4, there is an external branch to new line B+3. Therefore, in accordance with the above, the entry for this is the entry point into a new line since the entry point branch is taken externally. The remaining entries are determined in the same manner.

TABLE II

| LOC | CONTENTS |
|---|---|
| 0 | 3,I |
| 1 | 3,I |
| 2 | 3,I |
| 3 | 3,I |
| 4 | B + 3,E |
| 5 | 3,I |
| 6 | 3,I |
| 7 | C + 5,E |

The map table is searched on successive cycles by circulating the output back to the input. It continues the cycle until an external branch is found or until no branches are found in which case the next line is the next sequential line. The process terminates in four or fewer cycles for a four-way set-associative broadband BHT. After each lookup it stores the results in one of four registers, 51, 52, 53 and 54. If the results of a lookup are found to match the results of a previous lookup then it is known that an internal branch cycle has been found. In this event the maximum of all past lookups is incremented (so as to pass the branch cycle) and this results in the next entry point. This max function is performed by max circuit 60.

The operation of the prefetch engine can be understood in greater detail with respect to the example of the cache line of FIG. 4 and the map table of TABLE II. The entry point of the cache line is at 5, consequently the entry register 20 is initially set at 5. This causes map table 40 to generate an output of 3 for its location of the next branch and sets the I/E to I. This output is sent to selection circuit 65 which selects either the input from map table 40 or from adder 66. Adder 66 adds one to the output of max circuit 60. The selection is made under the control of either OR circuit 70 or the I/E bit on line 71. The output of 3 is also transferred from map table 40 to each of registers 51, 52, 53 and 54. These are in turn coupled to counter 72 which in the present example is a modulo 4 counter and enables each one of 51, 52, 53 and 54 in turn. It will be noted that counter 72 receives a clock signal from clock generator 80 and also the same clock signal is sent to the entry register 20. When the prefetch engine completes the task of finding an external branch, the registers 51, 52, 53, 54 and the counter 72 are reset 95, and the entry point into the new line is stored in the entry register 20. In this example, the initial state of the engine on entry into line A is that the entry register 20 contains the value 5, and registers 51, 52 53 and 54 all contain the value 0.

On cycle 0, map table 40 outputs the value 3,I. The value 3 is routed to the inputs of registers 51, 52, 53 and 54, and to the input of selector circuit 65. Counter circuit 72 enables register 51 which outputs the value 3. Comparator circuits 90, 91, 92 and 93 compare the value in entry register 20 to the outputs of registers 51-54, respectively. In this case, comparator 90 compares the values 5 and 3, and all other comparators 91-93 compare the values 5 and 0. Since none of them find an equal comparison, OR circuit 70 outputs the value 0 which does not affect selector circuit 65. Instead, the signal I from map table 40 causes selector 65 to route the value 3 to its output. Maximum circuit 60 determines the maximum value held in registers 51-54, in this case, 3. Incrementor 66 adds 1 to this value to obtain 4.

On cycle 1, clock generator 80 causes entry register 20 to be loaded with the value 3 from the output of selector circuit 65. Map table 40 again outputs the value 3,I. The value 3 is routed to the inputs of registers 51-54, and counter circuit 72 enables register 52. Comparator circuits 90 and 91 now find that both of registers 51 and 52 contain the same value as the entry register 20. OR circuit 70 outputs the value 1, which causes selector circuit 65 to route the output of the incrementer 66 back to the entry register 20. In this case, maximum circuit 60 outputs the value 3, so that incrementer 66, and hence selector 65, output the value 4.

On cycle 2, clock generator 80 causes entry register 20 to be loaded with the value 4 from the output of selector circuit 65. Map table 40 outputs the value B+3,E. Signal E denotes completion of the analysis, and it causes selector 65 to output the new line address B, and the new halfword entry-point 3. In addition, it resets registers 51-54 to the value 0.

Map table 40 as shown in FIG. 3 is comprised of sub-circuits to be described in FIGS. 4 through 10. The map table is a directly addressable table where the input is a halfword address within the line and the output is as described above. The implementation of the mapping function of map table 40 is as follows.

Figure 5B:
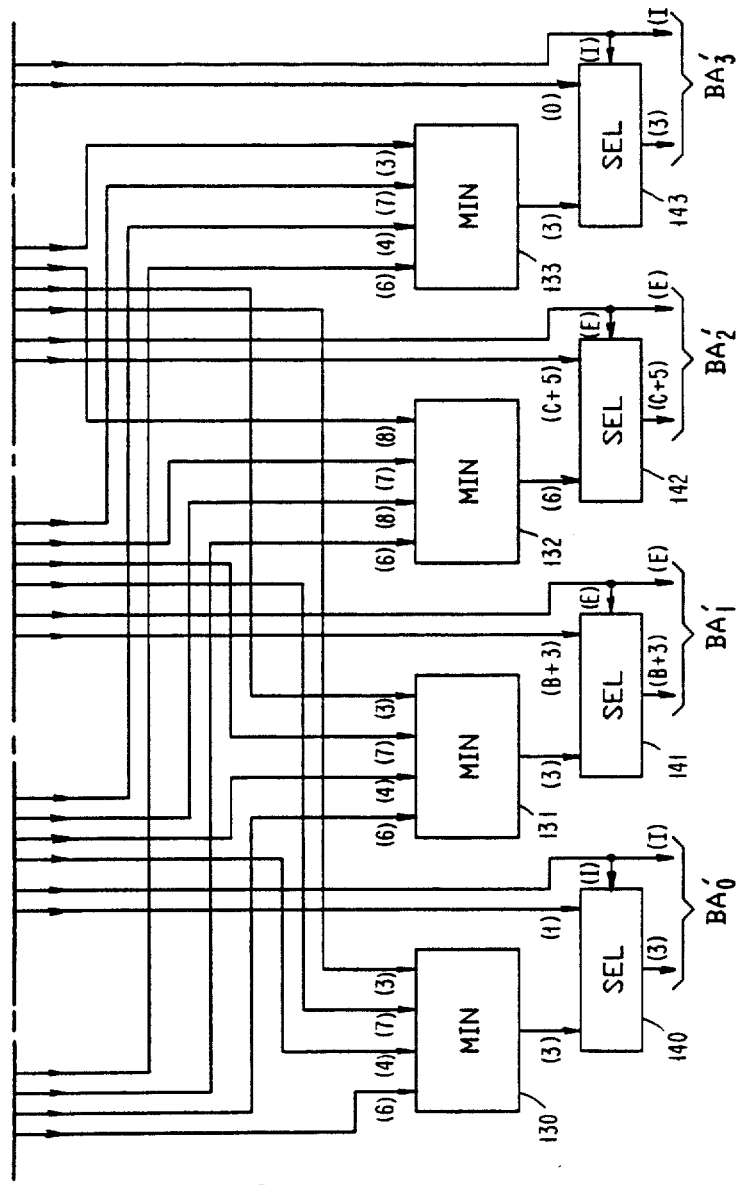

Refer now to FIG. 5. For every branch address $BA_i$ within a line such as A, a $BA_i'$ is determined that is the target address $TA_i$ if $BA_i$ is an external branch, or alternatively is the smallest $BA_i$ that is $\geq$ to $TA_i$ if $BA_i$ is an internal branch. This function is performed by the circuit of FIG. 5. Lines 31, 32, 33 and 34 from FIG. 1 are coupled to registers 105, 106, 107 and 108 to transfer thereto the branch address entry ($BA_i$), the target address ($TA_i$) and the setting of the I/E bit. In accordance with the previously described example, register 105 contains $BA_0=6$, $TA_0=A+1$, and I/E=0, register 106 will include $BA_1=4$, $TA_1=B+3$, and I/E=1. Register 107 will contain $BA_2=7$, $TA_2=C+5$, and I/E=1. Finally, register 108 contains $BA_3=3$, $TA_3=A+0$, and I/E=0, in accordance with TABLE I. Subsequent values are received over lines 31, 32, 33 and 34 from broadband BHT 21 for new lines.

Comparators 110 through 125 perform a comparison of information applied to both of their inputs and pass the BA input to the output if it is $\geq$ the TA input. Otherwise, the output is set to the largest number that it is possible to represent, plus 1. In this example, this value is binary 1000 obtained by fabricating a "dummy" high-order bit.

Comparators 110 through 125 compare branch addresses to target addresses and are arranged in groups of four for purposes of present explanation. Comparators 110 through 113 have as one input the branch address from register 105 and compare this to each and every one of the four target addresses available from registers 105, 106, 107 and 108. The remaining comparators 114 through 125 are arranged similarly so that all branch addresses and all target addresses for the group of four are compared. The result of these comparisons are then provided to minimum select circuits 130, 131, 132 and 133. These selection circuits are so arranged to compare and select the minimum of any of the values applied to their inputs and provide the value at their output. They are coupled so that the output of the comparators that are comparing the same target address are all applied to the same minimum selection circuit. Thus, for example, the output of comparators 110, 114, 118, 122 which each have as an input the target address from the register 105 are applied to minimum selection circuit 130. In like manner minimum selection circuit 131 takes its inputs from the outputs of comparators 111, 115, 119 and 123 which each compare the target address from register 102. Minimum selection circuits 132 and 133 have their inputs selected in the same manner.

The outputs of minimum selection circuits 130, 131, 132 and 133 are then coupled respectively to selectors 140, 141, 142 and 143, respectively. Selectors 140, 141, 142 and 143 select from one of two inputs and provide this input at their output. As stated above, one input is derived from minimum selection circuits 130–133 while the other input is derived from the target address portion of one of the registers. They are so arranged that selection circuits 140, 141, 142 and 143 derive their second input from registers 105, 106, 107 and 108 respectively. The selection is controlled by the I/E bit in each of the respective registers 105, 106, 107 and 108. The resulting $BA_i'$ output contains the minimum selected address if I/E=0 and otherwise specifies the target address $TA_i$.

As indicated in FIG. 5, register 105 for line A (100) has a value of $BA_0=6$, $TA_0=1$ and I/E bit=0. This is also contained in TABLE I and is derived from FIG. 4. The remaining registers are set similarly as described previously. Thus comparator 110 receives input of 6 and 1 and thus will output a 6. Similarly, comparator 114 receives an input of 4 and 1 and generates an output of 4, comparator 118 receives inputs of 7 and 1, and generates an output of 7 and comparator 122 receives inputs of 3 and 1 and generates an output of 3. Each of these is applied to minimum selection circuit 130 which accordingly selects 3 as the minimum of these four values, which value is then supplied to selection circuit 140 together with the value of the target address from register 105 which is a 1 (actually A+1). Since the I/E bit is set to 0, the selection is made to select the value of 3 which is provided as the $BA_0'$ output.

Note that minimum selection circuit 131 receives inputs from comparators 111, 115, 119 and 123. In this example, the minimum value is 3, but since circuit 141 simply selects the target address of B 3 from register 106. B+3 together with an external bit of 1 will be provided as the output for $BA_1'$. The remaining outputs $BA_2'$ and $BA_3'$ can be calculated in the same matter.

Figure 6:
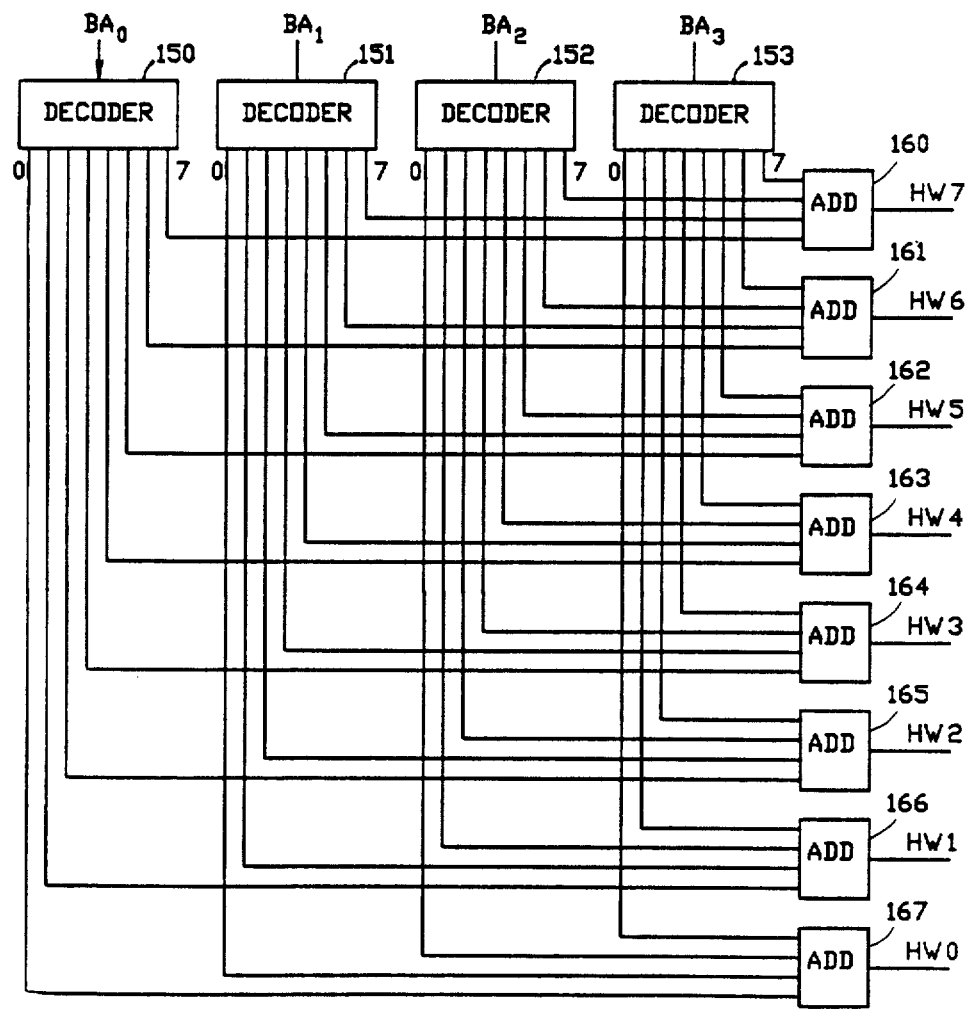
FIG. 6 is a circuit for counting branches in a line.

Refer now to FIG. 6. In parallel with the above described operation for the circuit of FIG. 5, the map table then establishes how many branches occur in a line after any halfword for every halfword in the line. The circuit that accomplishes this is shown in FIG. 6. The number of branches is determined by straightforward addition of the number of $BA_i$ that are greater than or equal to any halfword address. The desired outputs in the example for Line A are shown in TABLE 3.

TABLE 3

| HALFWORD ADDRESS | BRANCHES |
| --- | --- |
| HW7 | 1 |
| HW6 | 2 |
| HW5 | 2 |
| HW4 | 3 |
| HW3 | 4 |
| HW2 | 4 |
| HW1 | 4 |
| HW0 | 4 |

These values are evident from observation of FIG. 4. For example, looking at halfword 3 it is observed that there are four branches that will be encountered on a sequential forward scan from halfword 3 through the end of the line, thus the value associated with halfword 3 is 4. For halfword 4, a forward scan of the line reveals three branches will be encountered and thus the value assigned to HW4=3.

The circuit of FIG. 6 works as follows. Decoders 150 to 153 receive a binary number from the appropriate input $BA_i$ from BHT 21 on the appropriate lines 31–34. Each of the decoders 150 to 153 have a single input which receives a binary number which may be anywhere from 0 to 7 in the present example, and indicates the input on a plurality of outputs. Each of the outputs is assigned to a particular bit position such that for a given input binary number all output positions having a value equal to or less than the input binary number will be assigned a 1. All locations having an assigned value greater than the input binary number will be zero. Thus, referring to the $BA_3$ line on decoder 153, if a 6 were input the positions 0 through 6 would all have values of 1 where as the bit location 7 would have a value of 0. In like manner, all the other decoders will decode the data submitted to them. Accordingly, the outputs of the decoders are then coupled so that all of a selected bit position will be coupled to the same adder. Thus, all bit positions 7 for example, from 150, 151, 152 and 153 will be coupled to adder 160. In similar manner, adders 161 through 167 have as their respective inputs the positions 6 through 0. Adders 160 through 167 are adders known in the art and merely add the four inputs and have an output of a binary number having the value corresponding to the addition of the inputs. As an example, adder 163 which is responsible for halfword 4 will receive a 0 from decoder 153 but will receive 1 from decoders 150 through 152. This agrees with the desired value in TABLE 3 above.

Figure 7:
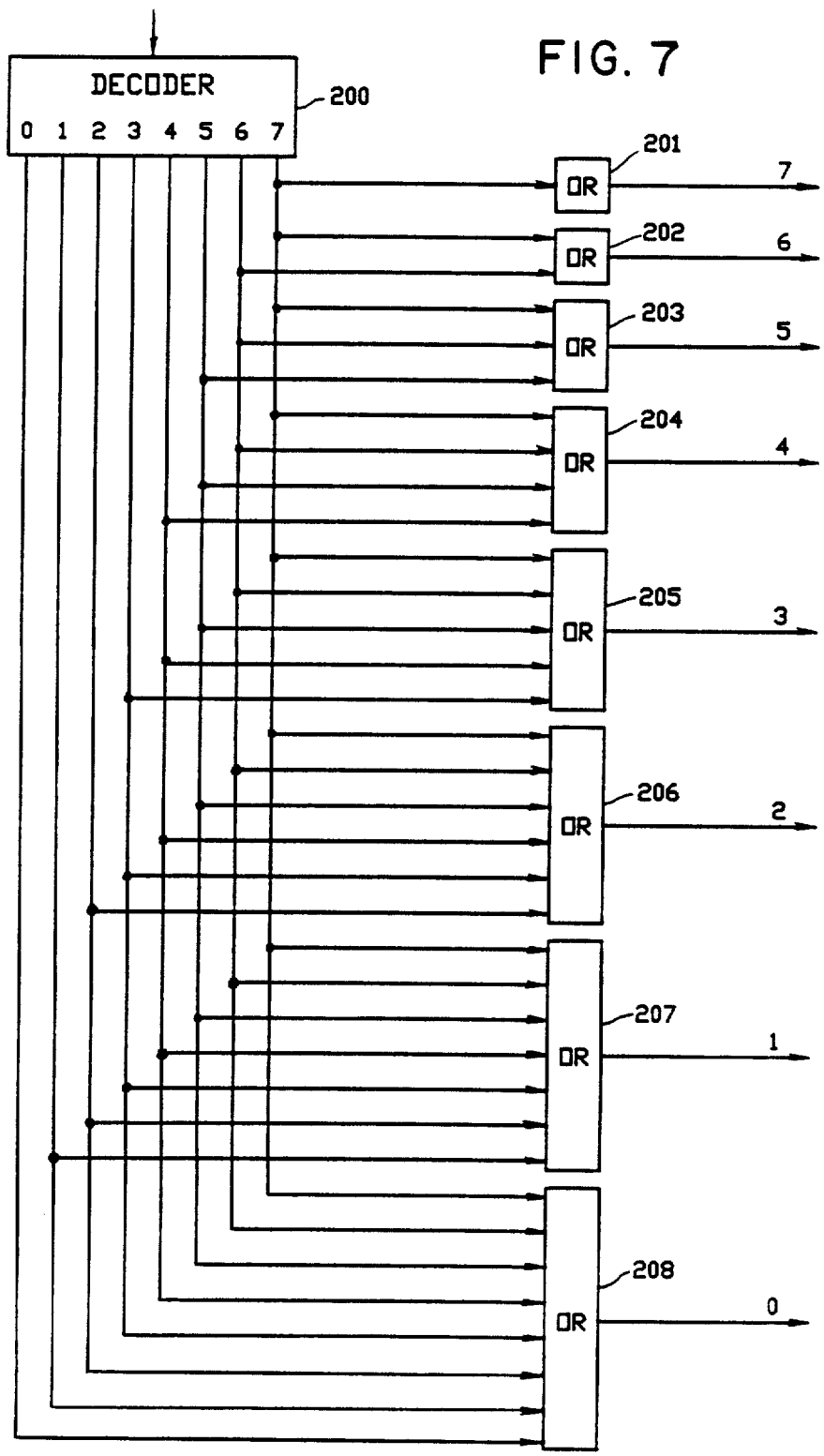
FIG. 7 is a greater than or equal to decoder.

Decoders 150–153 are shown in detail in FIG. 7.

Decoder 200 may be implemented using standard digital logic components. Decoder 200 decodes binary coded inputs into one of 8 mutually exclusive outputs. Each of the outputs of decoder 200 corresponds to a particular halfword address within a line. Such decoders and demultiplexers are known in the art. The output of the decoders are then coupled appropriately to OR gates 201 through 208 respectively. As shown from the example of a decoder having 8 outputs, OR gate 208 is coupled to each output. OR gate 208 carries the data for the zero position of decoder 200. Thus for example if there is a value of 6 input into decoder 200 its line 6 will go high and have the value of 1 whereas all the other lines will have a value of 0. Since line 6 is coupled to OR gates 202 through 208 each one of these will also have an output of 1. Thus, decoder 150 will have an output of 0 at its line 7 but outputs 0–6 will all be 1.

Figures 8, 8A, 8B:
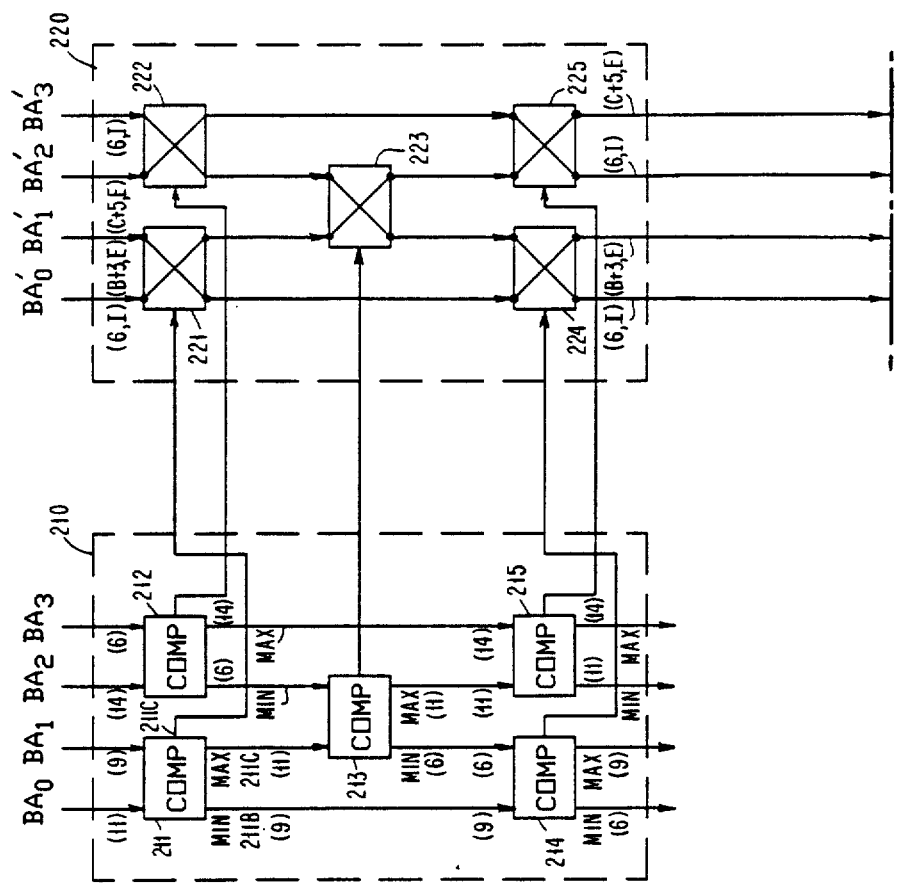
FIG. 8, 8A and 8B show a circuit for entering the correspondences into a map table.
Figure 8B:
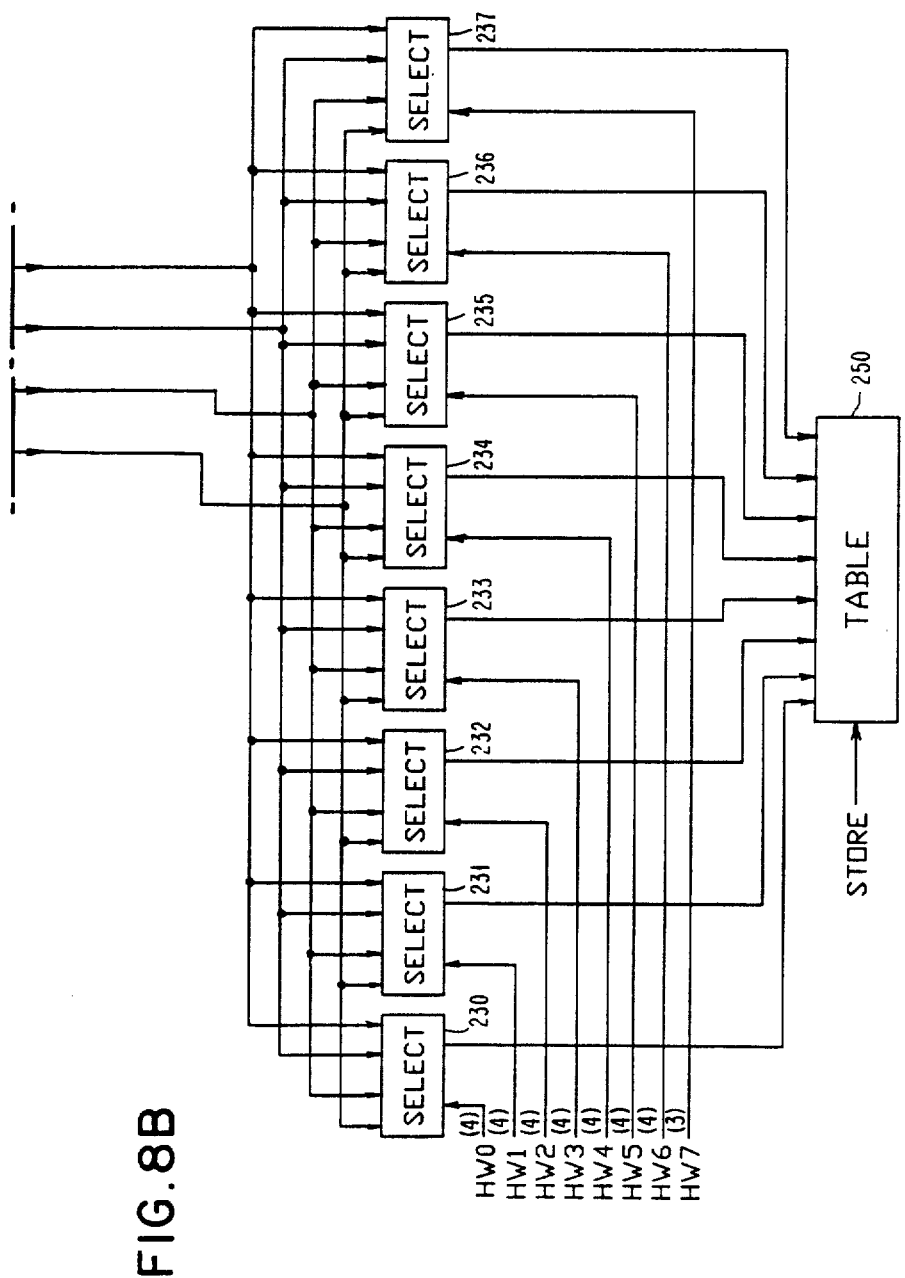

FIG. 8 shows how the correspondences between $BA_i$ and $BA_i'$ are entered in the map table. The circuit of FIG. 8 receives the $BA_i$ inputs from the BHT 21 via lines 31 to 34. The $BA_i'$ inputs are received from the correspondence circuit of FIG. 5 and the HW0 through HW7 inputs are received from the counter circuit of FIG. 6.

Comparator block 210 receives the $BA_i$ inputs, orders them and in turn controls switch block 220 which receives the $BA_i'$ inputs. The actual ordered $BA_i$ entries are not used for entry into the map table but the ordering is used to reorder the $BA_i'$ entries.

Comparator block 210 includes min-max comparators 211–215 which take two inputs, order them at its minimum and maximum outputs and also provides an output indicating whether or not the two inputs were switched. Thus, the min-max comparator 211 compares values at 211A and 211B and provides an indication of the result of its comparison on 211C. In the example under discussion, min-max comparator 211 receives $BA_0$ and $BA_1$, at its inputs and reorders them so that the $BA_1$ input appears at the min output 211A and the $BA_0$ input appears at the max output 211B when $BA_0=6$ and $BA_1=4$. The indication of the reordering is then provided at 211C which is coupled to switch 221 which in response to the signal from 211C determines whether or not it should switch the order of its inputs. The remaining switches and switch block 220 work in a similar manner and are paired with appropriate min-max comparators in comparator block 210. Thus comparator block 212 provides a result signal to switch 222 and comparators 213, 214 and 215 provide their respective results to switches 223, 224 and 225. The output of switch block 220 are then applied to selectors 230 through 237. Selection circuits 230 through 237 select one of four inputs in accordance with the value placed on their selection inputs. Thus, for example, if a 4 is applied on halfword 0 to selector 230 the value from its input 4 is provided at its output. In the present example, a value of 3 for the branch address within the line and I/E=0 for the status of the I/E bit is found at its input 4 and this value is in turn provided at its output which is the IN0 output. The outputs from each of the selection circuits is then provided to table 250 in which they are stored.

Figure 9:
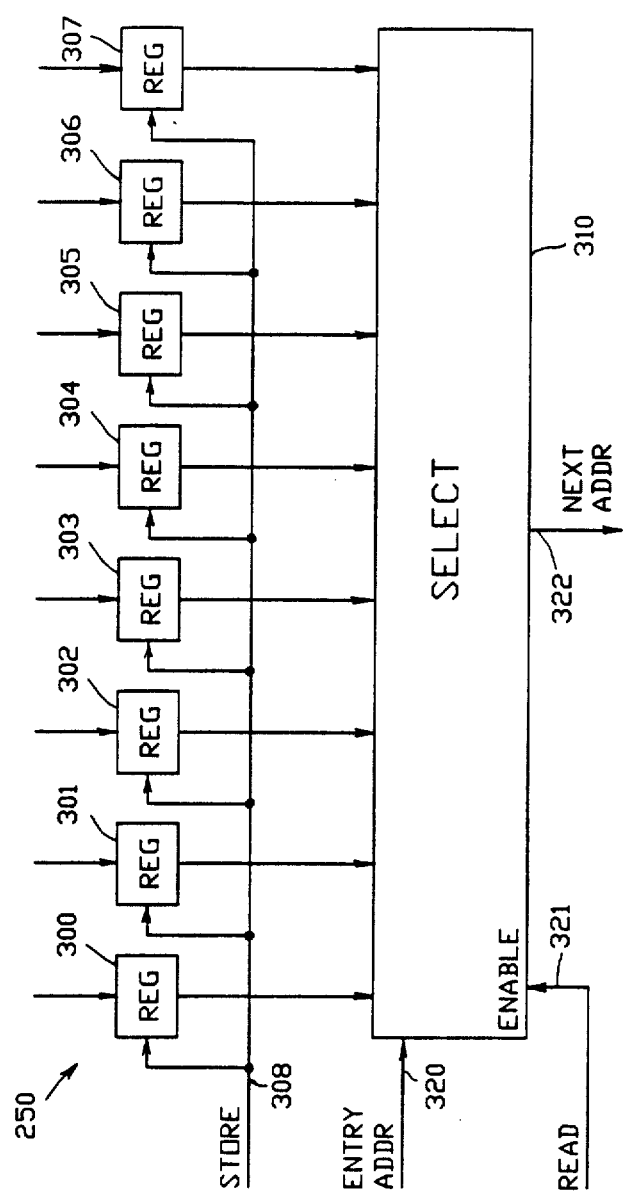
FIG. 9 is an implementation of a table.

Referring now to FIG. 9, the internal operation and structure of table 250 is shown. Table 250 includes registers 300 through 307. Each of these registers 300 to 307 are coupled respectively to the inputs IN0–IN7 which are received from the circuit of FIG. 8. All registers are loaded in parallel by input 308. Registers 300 to 307 thus act as storage buffers. Selection circuit 310 can select any of the values from its inputs which are coupled to registers 300 to 307. These inputs are selected by the entry address at 320 which is in turn obtained from entry register 20. The output 322 of the selection circuit 310 is enabled by READ input 321.

Figure 10:
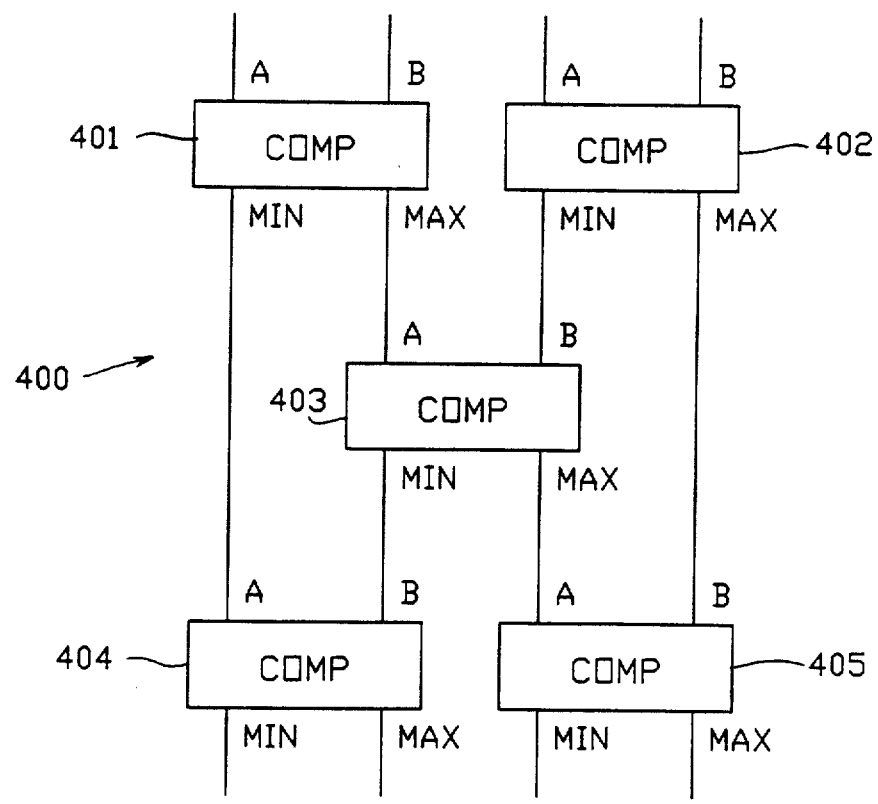
FIG. 10 is a minimum/maximum circuit.

FIG. 10 shows an implementation of the min-max circuit used for example in FIG. 3 as 60 and in FIG. 5 as, for example, 130. The four input min-max circuit 400 includes five two-input min-max circuits 401–405. This four input min-max circuit is identical to block 210 in FIG. 208 and operates in identical manner thereto. This circuit may be recursively extended in a straightforward manner to accommodate an arbitrary number of inputs. It is an implementation of a bitonic sort, as known in the art.

We claim:

1. In a computer with a processor, a main memory, said main memory storing a plurality of lines of instructions, and a cache, said cache temporarily storing instruction lines received from said main memory, apparatus for prefetching instruction lines from said main memory to said cache, comprising:

a branch history table having a plurality of entries, each said entry corresponding to an instruction line in said main memory and comprising addresses of all branches predicted as taken in said corresponding line;

means connected to said branch history table for determining from the branch history table entry for a current instruction line in use by, or in queue for use by, the processor and from an address of an entry point into said current line by the processor, a next instruction line to be used by the processor and an entry point into said next line; and means responsive to said determination of the next instruction line for prefetching said next line from said main memory into said cache in the event said next line is not already in said cache;

said determining means comprising:

entry register means for receiving and storing initially the entry point address for said current line;

map table means receiving the current address stored in said entry register means and the taken branch addresses from the branch history table entry for said current line, and outputting (a) in the event there is no taken branch in said current line following the address stored in said entry register means, the address of the next sequential instruction line in said main memory, and (b) in the event the taken branch that follows the address stored in said entry register means has a target address in said current line, the address of the next taken branch that will be encountered in said current line after taking said taken branch which follows said stored address, or the address of the next sequential instruction line in said main memory if no other taken branches will be encountered in said current line after taking said taken branch which follows said stored address, and (c) in the event the taken branch that follows the address stored in said entry register means has a target address outside said current line, said target address; and means for updating the address stored in said entry register means in the event that said map table means outputs a next taken branch address.

2. Cache prefetching apparatus as defined in claim 1, wherein:

said updating means stores in said entry register means said outputted next taken branch address when said outputted next taken branch address is first encountered as an outputted next taken branch address, and said updating means stores in said entry register means an address one position later than said outputted next taken branch address in the event said outputted next taken branch address has already been encountered as an outputted next taken branch address.

3. Cache prefetching apparatus as defined in claim 1, and further comprising:

means for storing the addresses of next taken branches outputted by said map table means, said updating means storing in said entry register means said outputted next taken branch address in the event said outputted next taken branch address is not already stored in said storing means, and said updating means storing in said entry register means an address one position later than said outputted next taken branch address in the event said outputted next taken branch address is already stored in said storing means.

4. Cache prefetching apparatus as defined in claim 1 wherein said map table means is logic circuitry which products the output corresponding to the set of inputs within a single machine cycle.

5. Cache prefetching apparatus as defined in claim 4 wherein said updating means is logic circuitry which updates the address stored by said entry register means in the same machine cycle during which a new output is produced by said map table means.

6. Cache prefetching apparatus as defined in claim 1 wherein said map table means outputs an address other than a next taken branch address in no more machine cycles than the number of addresses of taken branches in the branch history table entry for the current line.

7. In a computer with a processor, a main memory, said main memory storing a plurality of line of instructions a cache said cache temporarily storing instruction lines received from said main memory and a branch history table, with branch information for an entire instruction line of said main memory forming a single entry in said branch history table, and where the branch history table entry for a current instruction line and an entry point into said current line is used to predict a next instruction line to be used by said processor and an entry point into said next line, said next line being prefetched from said main memory into said cache if it is not already there, the combination comprising:

entry register means for receiving and storing initially the entry point address for a current line;

map table means receiving the current address stored in said entry register means and the addresses of all taken branches for said current line from said branch history table entry for said current line, and outputting (a) in the event there is no taken branch in said current line following the address stored in said entry register means, the address of the next sequential instruction line in said main memory, and (b) in the event the taken branch that follows the address stored in said entry register means has a target address in said current line, the address of the next taken branch that will be encountered in said current line after taking said taken branch which follow said stored address, or the address of the next sequential instruction line in said main memory if no other taken branches will be encountered in said current line after taking said taken branch which follows said stored address, and (c) in the event the taken branch that follows the address stored in said entry register means has a target address outside said current line, said target address; and means for updating the address stored in said entry register means in the event that said map table means outputs a next taken branch address.

8. The combination in claim 7, wherein:

said updating means stores in said entry register means said outputted next taken branch address when said outputted next taken branch address is first encountered as an outputted next taken branch address, and said updating means stores in said entry register means an address one position later than said outputted next taken branch address in the event said outputted next taken branch address has already been encountered as an outputted next taken branch address.

9. The combination of claim 7, and further comprising:

means for storing the addresses of next taken branches outputted by said map table means, said updating means storing in said entry register means said outputted next taken branch address in the event said outputted next taken branch address is not already stored in said storing means, and said updating means storing in said entry register means an address one position later than said outputted next taken branch address in the event said outputted next taken branch address is already stored in said storing means.

* * * * *